United States Patent
Care et al.

(10) Patent No.: US 7,146,849 B2
(45) Date of Patent: Dec. 12, 2006

(54) LEAKAGE DRAIN

(75) Inventors: Ian C D Care, Derby (GB); Mark Loweth, Derby (GB)

(73) Assignee: Rolls-Royce, PLC., London (GB)

( * ) Notice: Subject to any disclaimer, the term of this patent is extended or adjusted under 35 U.S.C. 154(b) by 0 days.

(21) Appl. No.: 11/048,850

(22) Filed: Feb. 3, 2005
(Under 37 CFR 1.47)

(65) Prior Publication Data

US 2005/0204802 A1  Sep. 22, 2005

(30) Foreign Application Priority Data

Feb. 4, 2004 (GB) ................................ 0402401.4

(51) Int. Cl.
*G01M 3/04* (2006.01)
(52) U.S. Cl. .......................................... 73/40; 73/49.7
(58) Field of Classification Search .................. 73/40, 73/49.7
See application file for complete search history.

(56) References Cited

U.S. PATENT DOCUMENTS 4,384,557 A * 5/1983 Johnson ................. 123/198 D
4,710,550 A * 12/1987 Kranbuehl .................... 526/60
5,202,667 A    4/1993 Alvin .......................... 340/605

FOREIGN PATENT DOCUMENTS

DE      100 47 586 A1    6/2002
JP      A-2001-153751    6/2001
WO      WO 98/54559     12/1998

* cited by examiner

*Primary Examiner*—Daniel S. Larkin
(74) *Attorney, Agent, or Firm*—Oliff & Berridge, PLC

(57) ABSTRACT

A leakage drain is used to provide an indication that leakage of a fluid has occurred within an engine. Previously, such leakage was detected by visual inspection of a retained drop at the outlet of a drain. With the present invention, a sensor arrangement comprising electrodes is located within or about the leakage drain whereby leakage fluid creates a film across those electrodes. Relative presence or absence or thickness of film causes variation in a detected electrical response (capacitance, reactance, resistance or impedance) and this variation is utilized in order to determine whether fluid leakage has occurred. Additionally, by time of flight analysis using electrostatic sensors it is possible to determine fluid flow rate. By analysis at different incident frequencies, a characteristic response for a particular type of leakage fluid is obtained. Thus, it is possible to deduce the type of leakage fluid as well as the rate of leakage. A single leakage drain may be utilized for a number of different leakage fluid types.

15 Claims, 4 Drawing Sheets

LEAKAGE DRAIN

FIELD OF INVENTION

The present invention relates to leakage drains and more particularly to sensors utilized with regard to leakage drains used in engines to identify leakage of fluids, such as lubricating oil, hydraulics fluid, water, fuel and combinations thereof.

BACKGROUND OF THE INVENTION

It will be appreciated that engines are relatively complicated assemblies incorporating a number of moving components with appropriate seals between them. These seals may fail or through other factors there may be leakage of a fluid, such as oil, hydraulic fluid, coolant or otherwise. Clearly, such leakage is indicative of some form of failure within the engine in terms of sealing or otherwise. In such circumstances, it is necessary to provide some form of signal flag indicating that failure.

Traditionally, a drainage tube has been utilized through which the leakage passes. The tube is dimensioned whereby a droplet of the relevant liquid remains at the end of the drainage tube when engine operation ceases. In such circumstances during a regular maintenance check, presence of such a droplet at the end of the drain indicates an underlying leakage problem within the engine to be corrected.

Inherent problems with such visual and manual detection of leakage is with respect to the potential for missing the presence of a leakage droplet at the end of the drain, the time span between maintenance/service checks and the difficulty with regard to distinguishing different fluids. It will be understood that the fluid leakages from the engine are captured and led down the drain and that normally there are several drain passages at the bottom of the engine housing. These drains are of a tubular nature with a diameter such that a drop of leaking fluid is normally retained at the end of the tube. However, this droplet may not be retained as a so-called "wet tube" with the result that particularly under poor maintenance conditions, small leaks may go undetected for considerable periods of time resulting in a more serious problem developing.

Turbulence is created where the drains protrude from the engine casing, so it is beneficial to minimize the number of such protuberances.

SUMMARY OF THE INVENTION

In accordance with the present invention there is provided a leakage drain for an engine, the leakage drain comprising a passage leading from a potential leakage area for, a fluid to an outlet, the drain characterized in that towards the outlet a fluid film sensor arrangement is provided whereby an electrical quotient variation in any fluid film wetting the passage is indicative of fluid leakage through that passage.

Typically, the electrical quotient is resistance, capacitance, reactance or impedance.

Normally, the fluid flow sensor arrangement is towards an outlet for the drain.

Preferably, the film sensor arrangement is provided upon the inside of the passage.

Possibly, different excitation frequencies are provided across the film sensor arrangement in order to distinguish between fluids by their characteristic response with excitation frequency.

Generally, those characteristic responses are utilized to determine the actual leakage fluid type from a range of potential leakage types.

Normally, that determination is by reference to and comparison with stored characteristic responses for different fluid types.

Normally, the sensor arrangement comprises metal strips spaced apart whereby any fluid film wets between those metal strips in order to provide an electrical quotient response dependent upon the dielectric nature of that fluid film. Typically, the metal films are surface mounted upon the passage. Alternatively, the metal strips are embedded within the passage.

Advantageously, the film sensor arrangement is mounted upon an appropriate electrical insulator. Typically, that electrical insulator is a ceramic or PTFE substrate.

Advantageously, the film sensor arrangement comprises respective sensor elements for time of flight/determination of any liquid passing through the drain whereby that time of flight determination is indicative of rate of fluid leakage flow.

Generally, the time of flight sensor elements comprise respectively spaced metallic bands either side of sensor elements for determination of the electrical quotient variation in any fluid film wetting the passage upon fluid leakage through the drain.

Also in accordance with the present invention there is provided an engine incorporating a leakage drain as described above.

BRIEF DESCRIPTION OF THE DRAWINGS

Embodiments of the present invention will now be described by way of example and with reference to the accompanying drawings in which.

DESCRIPTION OF THE PREFERRED EMBODIMENTS

Figure 1:
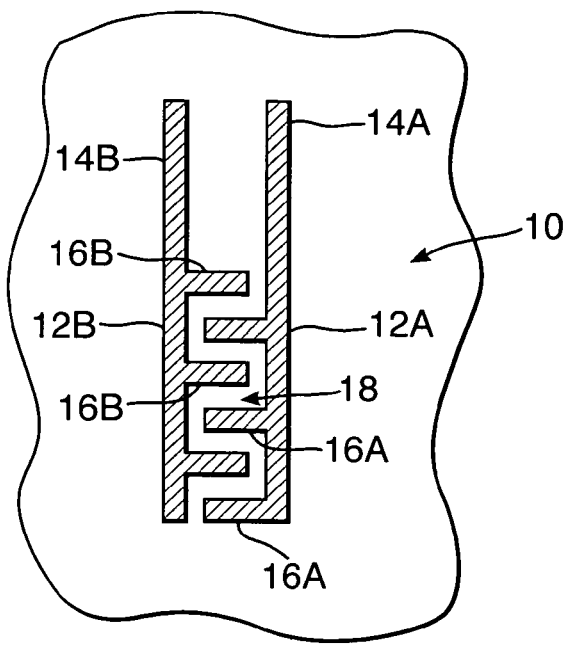
FIG. 1 is a schematic view of a sensor arrangement of a type utilized in accordance with the present invention.

FIG. 1 illustrates a sensor arrangement 10 for sensing a property of a film of material, such as film thickness. The sensor 10 is in the form of two electrodes 12A, 12B formed, for example, by metal deposition on an insulating substrate. Each electrode has a lead segment 14A, 14B continuous with a series of fingers 16A, 16B. The fingers 16 of the electrodes 12 are interdigitated so that a serpentine gap 18 of constant width is formed therebetween.

In use, a film of material, such as oil, covers the sensor 10. It is found that electrical properties measured between the electrodes 12 will vary in dependence on the thickness of the film on the sensor 10. Various electrical properties can be measured by application of voltages between the electrodes 12, and therefore across the gap, such as resistance, reactance, capacitance or impedance.

Figure 2:
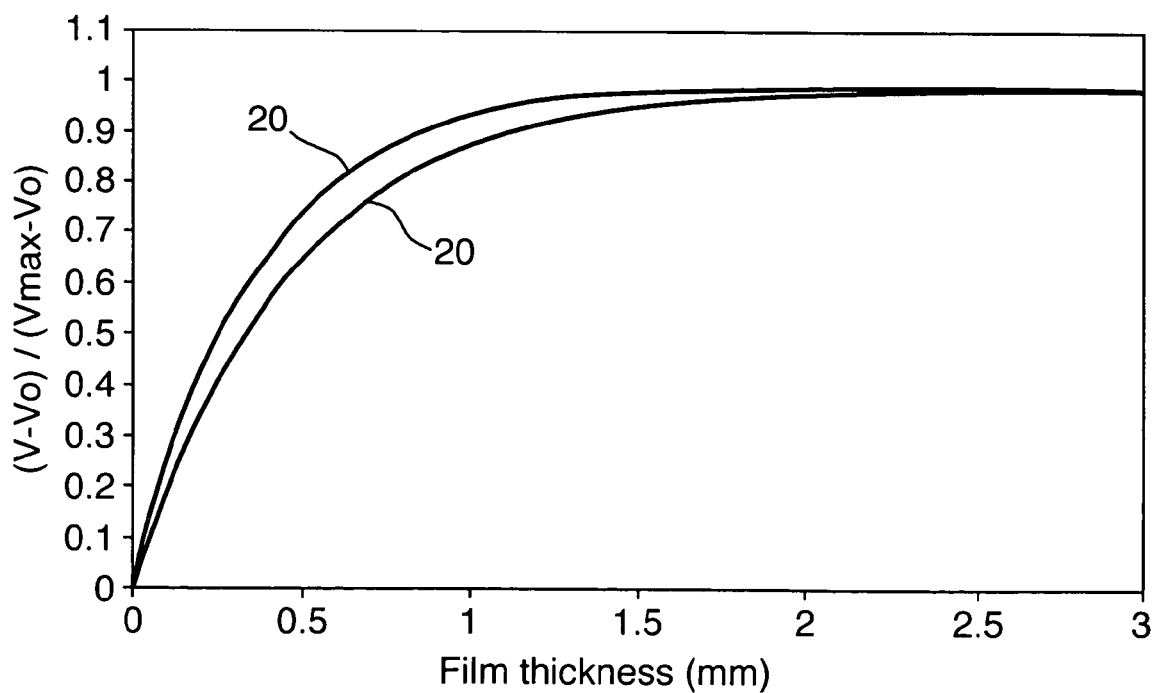
FIG. 2 is a plot of the characteristic response of a sensor like that depicted in FIG. 1.

FIG. 2 is a plot of two output characteristics typical of sensors of the type shown in FIG. 1. The two different characteristics 20 are for different gap widths. The plots in FIG. 2 relate film thickness (horizontal axis) and a normalized voltage value, effectively indicating the capacitance (vertical axis). It can readily be seen that the characteristics 20 are similar in form and are significant non-linear. In each case, the illustrated characteristics would have an effective upper limit on film thickness for accurate measurement, at about 1 mm, although measurements could be taken up to about 1.5 mm thickness. Linearity ceases at about 0.4 mm. At greater thicknesses, the output characteristic of the devices has saturated and further useful information cannot be retrieved. That is, a further increase in film thickness results in no perceptible increase in capacitance. Similarly, a measurement of resistance across the gap will also saturate.

Characteristics of this general form, in particular exhibiting saturation, are typical of sensor geometries which, like FIG. 1, have a constant gap between the electrodes. The upper characteristic is for the narrower of the gaps, showing that a narrow gap will saturate sooner than a wide gap.

As an alternative to providing electrodes which are evenly spaced, it will be understood that it may be possible to provide electrodes which vary in spacing in order to provide better analysis of the fluid film between the electrodes. U.K. Patent Application No. 0300664.0 provides details with regard to that approach with respect to creating such a sensor arrangement.

The present invention in particular relates to leakage drainage used in engines, such as aircraft engines, in which a leakage drain is provided as a passage from a gallery or other collection area where fluid leakage may congregate. The leakage drain generally operates in a downward direction towards the bottom of the engine in order to utilize gravity with respect to fluid movement through the passage of the drain. It will be appreciated that accommodation of such a drain within an engine housing or structure may be difficult. The present invention allows the leakage drain to have a substantial horizontal component rendering it easier to accommodate a leakage drain within an engine. Furthermore, rather than depend upon a manual sight inspection of the leakage drain outlet in order to determine whether a leakage droplet has been retained, the present invention allows remote interrogation or continuous monitoring of the leakage drain.

Figure 3:
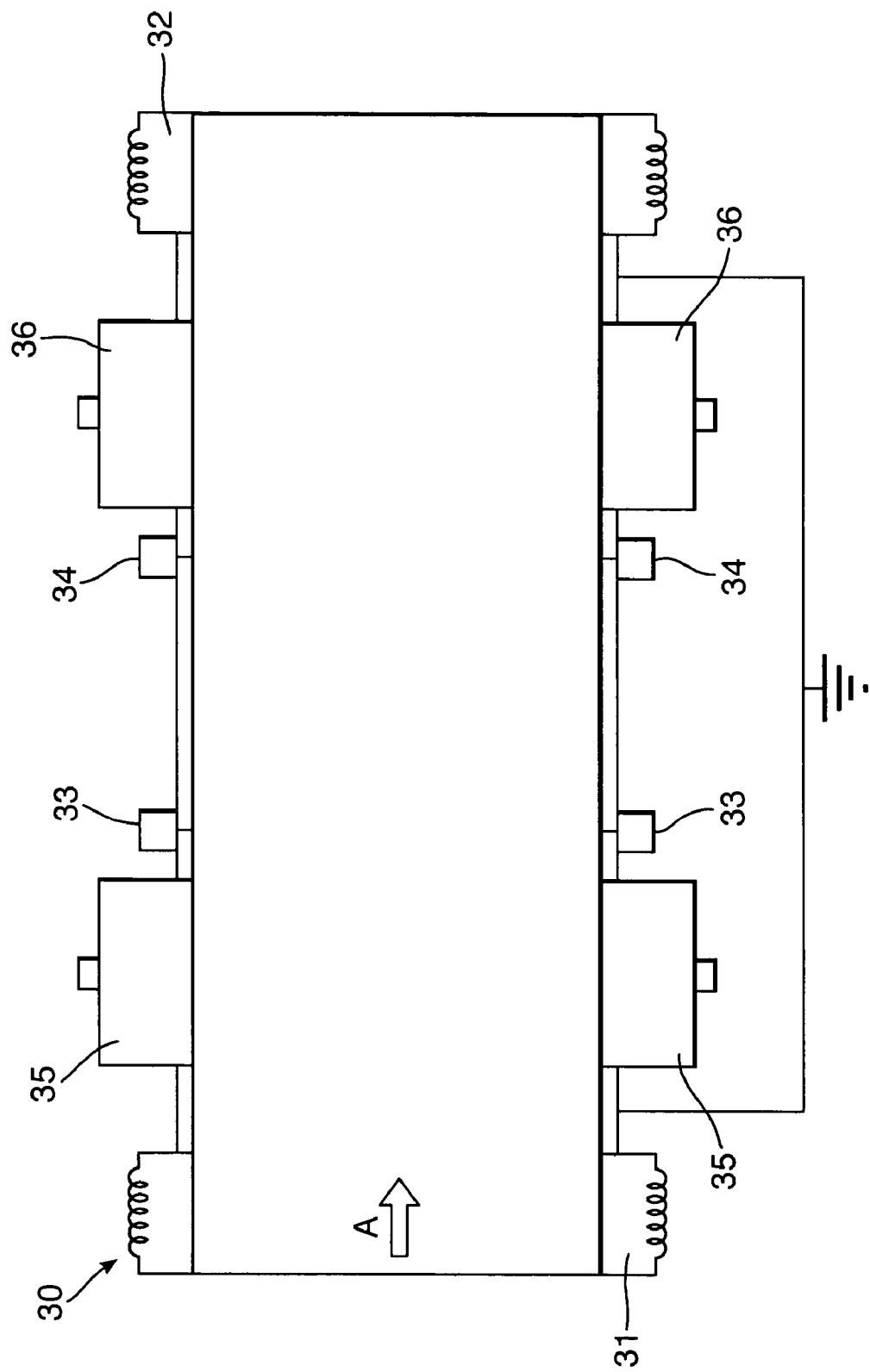
FIG. 3 is a schematic cross section of part of a leakage drain in accordance with the present invention.

FIG. 3 illustrates a section 30 of a leakage drain in accordance with the present invention. The leakage drain section 30 is generally tubular with screw thread fittings 31, 32 at either end to enable the section 30 to be secured within an appropriate passage for drainage. In accordance with the present invention, at least two electrodes 33, 34 are provided either as surface mounted or recessed elements within the wall of the section 30. As will be described later, generally these electrodes 33, 34 are formed from a conductive strip, such as metal or carbon, with inter-engaging fingers in order to define a gap between respective fingers of the electrodes 33, 34 within which a fluid passing in the direction of arrowhead A is presented to wet therebetween. In such circumstances, as described above, through an electrical quotient variation in terms of resistance, reactance, capacitance or impedance the nature of that fluid can be determined by its dielectric nature.

At a basic level the present invention simply provides the electrodes 33, 34 in operation as described with regard to FIGS. 1 and 2 in order to determine fluid flow and therefore wetting indicative of fluid leakage through the leakage drain. In such circumstances, a simple yes/no interrogation regime is provided with a suitable trigger level to accommodate spurious results as a result of condensation or otherwise. It will be appreciated that the sensor arrangement provided by the electrodes 33, 34 may be continuously monitored or periodically interrogated as required to determine whether fluid has wetted the gap between the electrodes 33, 34. Clearly, it will be appreciated that the dielectric effect of the wetting fluid between the electrodes 33, 34 varies between air and different leakage fluid types. As indicated, a simple yes/no interrogation may be performed in order to raise a warning signal through appropriate means that leakage fluid is passing through the section 30 of a leakage drain in accordance with the present invention. Nevertheless, as intimated previously, it is possible through condensation, as a result of thermal cycling or capillary action/suck back, for a fluid to be drawn into the drain rather than disbursed. In such circumstances, it may be important that it is possible to differentiate between different fluid types. One approach, as described later, is to present varying excitation frequencies in terms of voltage potential across the electrodes 33, 34 in order that the characteristic impedance to frequency response is utilized through iterative comparison with stored references in order to determine the fluid presented across the electrodes 33, 34. More of this technique will be described later.

In order to be effective the electrodes 33, 34 must be isolated from one another and preferably from the leakage drain structure. Typically, the electrodes 33, 34 will be mounted upon an electrically insulating surface, such as a ceramic or PTFE substrate. Nevertheless, it should be appreciated that neither of the electrodes 33, 34 or the underlying electrically insulated substrate should react with potential leakage fluids which may pass through the leakage drain. As indicated previously these fluids may be of one of a number of differing types including oils, hydraulic fluids, coolants, water and fuels. It will also be understood that mixtures of these fluids may also drain through the same leakage drain but care should be taken with respect to conglomeration which may block the leakage drain. Through use of the characteristic response against excitation frequency it may be possible to distinguish between the differing leakage fluids in a leakage drain.

The spacing between the electrodes 33, 34 will depend upon operational parameters and requirements. One advantage with the present invention is that the sensor arrangement comprising electrodes 33, 34 may be able to detect differing fluids and therefore a common leakage drain can be used for a number of different potential leakage fluids. In such circumstances, a compromise spacing between the electrodes 33, 34 and in particular the interlocking finger digits of those electrodes 33, 34 may be chosen for best performance in terms of sensor response for the possible leakage fluids to be presented. Alternatively, a respective sensor arrangement for each particular fluid or idealized for that particular leakage fluid may be presented at differing positions along the leakage drain as required. Similarly, if a branched gallery feed to a common leakage drain is provided, each trunk section between the branches may incorporate its own sensor arrangement in terms of electrodes 33, 34 in order to allow isolation of the particular branch from which leakage has occurred.

Figure 4:
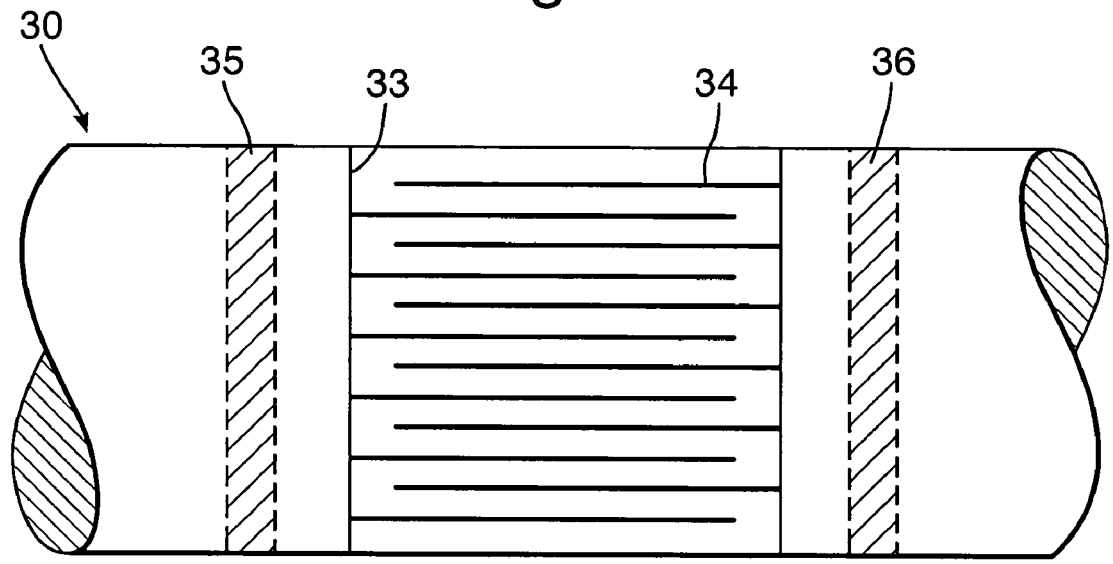
FIG. 4 is a schematic front view of the arrangement depicted in FIG. 3.

Leakage flows may be continuous or of a slug nature. Continuous leakage flow clearly indicates that there is a constant fluid leakage whilst slug flow implies leakage only under certain operational conditions. It will also be understood that there may be a combination of continuous and slug leakage flows whereby there is a continuous background leakage flow which is periodically increased by certain operational conditions to provide a short term slug of higher volume leakage flow. In either event, the present invention includes band sensors 35, 36 provided ideally either side of the principal sensor arrangement sensors 33, 34, as shown schematically in FIG. 4, in order to determine time of flight for leakage flow between these sensors 35, 36. These sensors 35, 36 will generally operate using an electrostatic time of flight technique whereby the sensors 35, 36 utilize the flow velocity to create static electricity balances which are utilized in order to determine flow rate. The tube from which the section 30 is formed may not be completely full of leakage fluid such that a solid column of such leakage fluid passes in the direction of arrowhead A, but rather a wetted flow surface may pass along the tube in contact with the walls of that section 30. In either event, this flow will be determined by the sensors 35, 36 and due to the electrostatic nature of such sensing, it will be possible to determine the volume of flow from a relatively small film wetting to the inner surfaces of the section 30 through to "solid" flow through that section 30. In either event, the gap between the electrodes 33, 34 will be wetted to enable fluid flow determination and/or fluid flow type as required.

Figure 5:
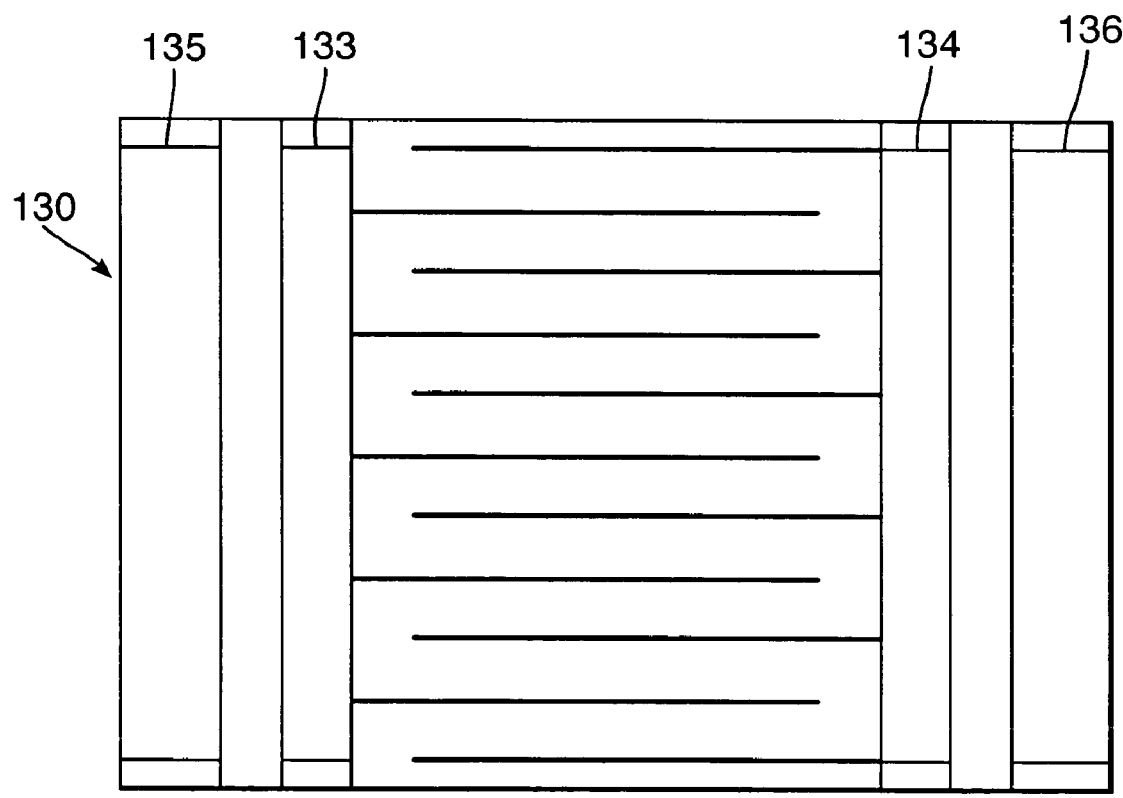
FIG. 5 is a schematic plan view of a sensor arrangement to be incorporated within a leakage drain in accordance with the present invention; and, FIG. 6 is a graphic representation illustrating electrical impedance response against excitation frequency.

As indicated above, the present invention will typically be incorporated within a leakage drain of a tubular nature. In such circumstances, a section 30 may be incorporated through appropriate fixing mechanisms, such as screw threads 31, 32 within that leakage drain. In such circumstances, a dedicated leakage drain section can be fabricated. Alternatively, as illustrated in FIG. 5 a sensor arrangement patch 130 may be formed comprising fluid determination electrodes 133, 134 and possibly electro static sensors 135, 136 all secured on a common insulating substrate. This substrate will then be located within an existing leakage drain or during fabrication of a new leakage drain with appropriate electrical connections to the electrodes 133, 134 and sensors 135, 136. The patch 130 will be secured by rolling within the leakage drain and pushing to an appropriate position as required in order to determine leakage fluid presence along with flow rate in terms of time of flight between the sensors 135 and 136.

The electrodes 33, 34 or 133, 134 which act as a sensor arrangement in accordance with the present invention for leakage fluid determination by film thickness and for flow determinations will normally be secured within the leakage drain. However, it is possible to secure electrodes externally of the leakage drain provided that electrical quotient variation due to dielectric constant changes with the presence of leakage fluid can be determined.

The present invention uses film thickness sensing to determine presence of leakage fluid in a leakage drain. With more sophisticated arrangements, it is possible also to discriminate between different fluid types and so the source or sources of leakage fluids within the drain. Nevertheless, it will be understood that certain combinations of fluids will create a reaction which may block a single leakage drain. For example, engine oil and hydraulic fluid is known to form a gel or jelly which may block a single leakage drain line. In any event, if such combinations are determined at least maintenance personnel will be advised that the drain needs to be flushed. It will also be understood that if leakage is expected, for example, as a condensation purge, then flow or presence of that purge fluid can be ignored.

By utilizing thickness film sensing variation across electrodes of an electrical quotient, such as resistance, capacitance, reactance or impedance, it will be understood that it is no longer necessary to provide a substantial vertical component in the leakage drain in order to ensure a visible droplet at the outlet of that drain. In such circumstances, a leakage drain in accordance with the present invention may be formed in a substantially horizontal pipe and this horizontal pipe utilized in order to determine single phase "solid" flow or slug flow.

Being a dynamic sensor arrangement, as indicated above, it is possible to provide continuous monitoring of the leakage drain or periodic interrogation. In either event, rather than wait for maintenance cycles, it is possible with the present drain to detect fluid leakage within an engine, and at parts of the flight operating cycle when that leakage actually occurs and probably with more limited leakage volumes and rates detectable. In such circumstances, the present drain leakage can become part of the engine condition monitoring system in order to flag potential problems with leakage as they occur. The present invention also provides a simple measurement of leakage rate which may be utilized in order to determine whether operations with that particular part of the engine should be curtailed, or operation of the engine adjusted to accommodate for such leakage without significant damage. Finally, with the possibility of discrimination between leakage fluid types, it is then possible to identify cross contamination between leakage fluids.

The sensor arrangement in accordance with the present invention is placed inside the drainage tube in order to measure the dielectric constant of the fluid passing through that tube via an electrical quotient variation. As indicated previously, there will normally be a step change indicative of the presence of a fluid film and this step change in dielectric response will be utilized in order to provide an indication as to fluid leakage. Clearly, in a large number of situations, the actual leakage fluid may vary. In order to differentiate between leakage fluids, the dielectric response of the thick film between the electrodes of the sensor arrangement can be measured at several input frequencies. These differing input frequencies will provide a characteristic impedance response for the particular fluid type. Different engine fluids, whether they be oil, hydraulic fluid, water, fuel or combinations, will therefore provide characteristic responses and the actual response determined through the sensor arrangement compared with a library of reference responses in order to deduce the fluid type or combination.

The actual sensor arrangement utilized in terms of configuration will depend upon installation requirements as well as expected leakage fluids. Typically, the sensor arrangement will be surface mounted or embedded within the leakage drain. Generally, there will be interleaving of digit fingers formed from metallic electrode patterns. It is essential that the sensor arrangement is presented upon a good electrical insulator with a poor capacitive dielectric response. Such a substrate ensures that the change in signal strength due to the liquid film developed between the electrodes is maximized. Ceramic and PTFE substrate are acceptable and allow appropriate electrode patterns to be etched or otherwise formed upon their surface or embedded therein.

Figure 6:
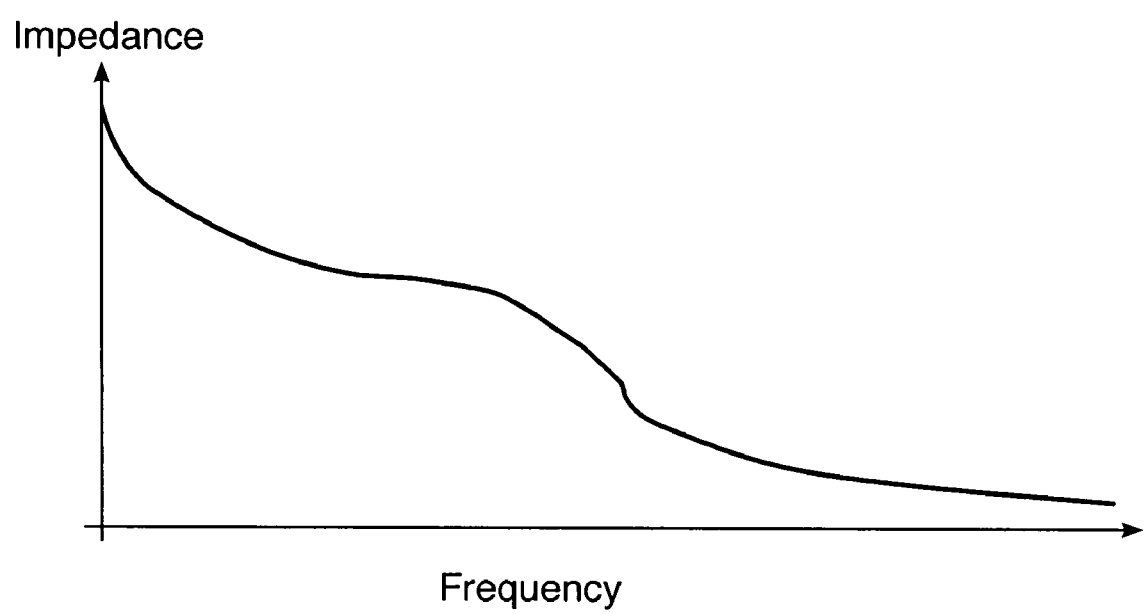

FIG. 6 provides a graphic representation of electrical impedance plotted relative to incident frequency. Generally, information is provided with regard to the leakage fluid, the thickness of that fluid about the electrodes and the fluids temperature by measuring the alternating current (AC) response at different incident frequencies. Electrical impedance can be plotted against the electrical capacitance for these different frequencies in order to determine a characteristic curve. By using more than one incident frequency, the effects of temperature variation can be eliminated in order to create a characteristic plot as depicted in FIG. 6. By comparison with stored reference characteristic curves, the actually determined curves through the present sensor arrangement of a leakage drain allow prediction as to the leakage fluid or combination of fluids currently, and possibly historically, through the drain. Once such determination has been performed, it is then possible for maintenance personnel to determine the probable source of such leakage fluid in terms of a failed seal or other cause of leakage.

Generally, the present invention as indicated can take the form of a distinct section inserted at an appropriate position, normally towards the outlet or potential source of leakage fluid or alternatively by insertion of a rolled sensor substrate with electrodes into the leakage drain passage, typically from the outlet end.

A particular problem is providing electrical connection to the sensor arrangement comprising electrodes across which the leakage fluid provides a film giving varying electrical responses indicative of that leakage fluid or combination of such leakage fluids. Simple rat tail wires may be secured to the electrodes or, particularly with distinct segments 30, external connections may be provided to allow interrogation of the electrodes by appropriate control means utilizing varying frequency voltages, etc.

Although principally described by reference to a metallic strip, it will be noted that an alternative would be carbon on a ceramic substrate for use where a metal, such as copper or aluminum, would react with an oil or hydraulic fluid/water combination to give spurious results.

It will be understood with regard to aircraft engines that ideally to reduce aerodynamic drag there will only be one leakage drain pipe or tube upon the engine cowling structure. By use of the present invention, it is possible as described to have a single leakage drain incorporating a sensor arrangement as described for differing leakage fluids.

Whilst endeavoring in the foregoing specification to draw attention to those features of the invention believed to be of particular importance, it should be understood that the Applicant claims protection in respect of any patentable feature or combination of features hereinbefore referred to and/or shown in the drawings whether or not particular emphasis has been placed thereon.

What is claimed is:

1. A leakage drain for an engine, the leakage drain comprising a passage leading from a potential leakage area for a fluid to an outlet, the drain characterized in that a fluid film sensor arrangement is provided whereby an electrical quotient variation in any fluid film wetting the passage is indicative of fluid leakage through that passage; and wherein different excitation frequencies are provided across the film sensor arrangement in order to distinguish between fluids by their characteristic response with excitation frequency.

2. A drain as claimed in claim 1 wherein the electrical quotient is resistance, capacitance, reactance or impedance.

3. A drain as claimed in claim 1 wherein the film sensor arrangement is provided upon the inside of the passage.

4. A drain as claimed in claim 1 wherein the film sensor arrangement is provided upon the outside of the passage.

5. A drain as claimed in claim 1 wherein those characteristic responses are utilized to determine the actual leakage fluid type from a range of potential leakage types.

6. A drain as claimed in claim 5 wherein that determination is by reference to and comparison with stored characteristics to responses for different fluid types.

7. A drain as claimed in claim 1 wherein the sensor arrangement comprises conductive strips spaced apart whereby any fluid film wets between those metal strips in order to provide an electrical quotient response dependent upon the dielectric nature of that fluid film.

8. A drain as claimed in claim 7 wherein the conductive strips are surface mounted upon the passage.

9. A drain as claimed in claim 1 wherein the film sensor arrangement is mounted upon an appropriate electrical insulator.

10. A drain as claimed in claim 9 wherein that electrical insulator is a ceramic or PTFE substrate.

11. A drain as claimed in claim 1 wherein the sensor arrangement is towards an outlet for the drain.

12. An engine incorporating a leakage drain as claimed in claim 1.

13. A leakage drain for an engine, the leakage drain comprising a passage leading from a potential leakage area for a fluid to an outlet, the drain characterized in that a fluid film sensor arrangement is provided whereby an electrical quotient variation in any fluid film wetting the passage is indicative of fluid leakage through that passage; and wherein the sensor arrangement comprises conductive strips, embedded within the passage, and spaced apart whereby any fluid film wets between those metal strips in order to provide an electrical quotient response dependent upon the dielectric nature of that fluid film.

14. A leakage drain for an engine, the leakage drain comprising a passage leading from a potential leakage area for a fluid to an outlet, the drain characterized in that a fluid film sensor arrangement is provided whereby an electrical quotient variation in any fluid film wetting the passage is indicative of fluid leakage through that passage; and wherein the film sensor arrangement comprises respective sensor elements for time of flight determination of any liquid passing through the drain whereby that time of flight determination is indicative of rate of fluid leakage flow.

15. A drain as claimed in claim 14 wherein the time of flight sensor elements comprise respectively spaced conductive bands either side of sensor elements for determination of the electrical quotient variation in any fluid film wetting the passage upon fluid leakage through the drain.

* * * * *